(12) United States Patent
Jones et al.

(10) Patent No.: US 9,037,421 B2
(45) Date of Patent: May 19, 2015

(54) LEAK DETECTION SYSTEM FOR UNIFORM VACUUM PACKAGED PRODUCTS

(75) Inventors: Kevin J. Jones, Mechanicsville, VA (US); Johannes J. M. de Koning, Glen Allen, VA (US); Geoffrey J. Parnell, Moseley, VA (US)

(73) Assignee: Flexicell Inc., Ashland, VA (US)

( * ) Notice: Subject to any disclaimer, the term of this patent is extended or adjusted under 35 U.S.C. 154(b) by 477 days.

(21) Appl. No.: 13/360,154

(22) Filed: Jan. 27, 2012

(65) Prior Publication Data

US 2013/0197832 A1    Aug. 1, 2013

(51) Int. Cl.
*G01M 3/34*    (2006.01)
*G01M 3/38*    (2006.01)

(52) U.S. Cl.
CPC ...................................... *G01M 3/38* (2013.01)

(58) Field of Classification Search
CPC ........... G01M 3/34; G01M 3/36; G01M 3/38; G01M 3/103; G01M 3/147; G01N 33/02; G01N 33/12; G01N 2201/0227
USPC ............... 702/51, 81, 84, 127, 179, 182–183, 702/185, 188–189, 199; 73/1.79, 40–41, 73/45.4, 49.2–49.3; 348/86, 92, 94–95, 348/125, 135, 142
See application file for complete search history.

(56) References Cited

U.S. PATENT DOCUMENTS

| 4,697,452 A | 10/1987 | Prakken |
| 5,533,385 A | 7/1996 | Frievalt |
| 6,955,256 B2 | 10/2005 | Tsoukalas et al. |
| 7,107,823 B1 | 9/2006 | Lovvorn |
| 7,475,590 B2 | 1/2009 | Yokota et al. |

OTHER PUBLICATIONS

Lampi et al., Automatic Infrared Radiometric Scanning to Detect Flexible Package Seal Defects, Nov. 1973, IEEE Transactions on Industrial Electronics and Control Instrumentation, vol. IECI-20, No. 4, pp. 205-212.*

* cited by examiner

*Primary Examiner* — Toan Le
(74) *Attorney, Agent, or Firm* — Laubscher, Spendlove & Laubscher, P.C.

(57) ABSTRACT

A leak detection system and method are characterized by scanning a surface of a vacuum package, generating a contour signal corresponding with the contour of the scanned surface, and comparing the contour signal with a stored contour signal of a similar package which is known to be free of leaks. The system includes a sensor such as a scanning device which scans a surface of the package and generates the contour signal. A signal processor connected with the scanning device processes the signal to generate a profile of the package surface. This profile is compared with a stored profile corresponding to a normal configuration for the package surface. When the scanned profile deviates from the stored profile, a leak within the scanned package is indicated.

11 Claims, 4 Drawing Sheets

LEAK DETECTION SYSTEM FOR UNIFORM VACUUM PACKAGED PRODUCTS

BACKGROUND OF THE INVENTION

Vacuum formed bags of products such as hot dogs are sealed in a vacuum chamber so as to remove all air which could cause premature spoiling of the product. As air is removed from the bag during the vacuum forming process, the bag shrinks about the product so that the resulting package has a uniform and fixed configuration. All similarly sized packages of the same product obtain a uniform configuration after vacuum packaging. Thus the surfaces of the packages are uniformly contoured.

In some instances during a vacuum sealing process, a seal is not properly made or the package incurs a leak which allows air to enter the package. Air entering the package quickly deforms the contours that are created during the vacuum sealing process. Because there is no efficient way to detect whether a seal has been broken or a leak occurs, many products which are vacuum sealed in this manner are packaged by hand to allow an operator to inspect every package. The operator inspection method is insufficient and unreliable at full production speeds.

BRIEF DESCRIPTION OF THE PRIOR ART

Various attempts have been made to develop a system for testing or monitoring vacuum packaged products to insure that the packaging has maintained its integrity and does not contain any leaks which would result in spoilage of a packaged food product. One such attempt is to submerge a package in a fluid filled vacuum chamber which expands the package or produces air bubbles that can be detected. This technique is currently used on a very small percentage of the entire production because it is extremely time consuming and cannot be performed on every package.

Camera systems have been used to map the profile of packages with structured lighting but the analysis tools available to a camera system are limited and cannot reliably determine a leaking package. Structured lighting such as a laser line projected at an angle across a package can provide a line indicating the profile of the package which can be captured with a camera. However, the line can be distorted or undetectable as it blends with the colors and reflections of the package being analyzed. Camera systems are also delicate and very expensive to implement. In addition, camera systems are not well suited for the harsh, wet, and caustic environment where vacuum packed food products are often located. Adding new undamaged package profiles for new packages or products to a camera system typically requires technical personnel to acquire training images and then modify the vision tools used to create a corresponding new production setup. This new package training process can be timely.

The present invention was developed in order to overcome these and other drawbacks by providing a high speed, reliable and cost effective system and method for determining whether a package has been properly vacuum packed while maintaining a good seal.

SUMMARY OF THE INVENTION

Accordingly, it is a primary object of the invention to provide an automated leak detection system for vacuum packages. The system includes a sensor for scanning a surface of a vacuum package and generating a signal corresponding to the contour of the surface. A signal processor such as a computer is connected with the sensor and processes the signal to generate a profile of the vacuum package surface. The signal processor further compares the profile with a stored profile corresponding to a normal configuration for the vacuum package surface. An indicator such as a display is connected with the signal processor to indicate whether the profile of the scanned package deviates from the stored profile. A deviation in the profile indicates a fault or leak in the vacuum package.

According to a preferred embodiment, the sensor is fixed relative to the package and the package passes beneath the sensor on a conveyor. The sensor is a distance measuring device which generates distance signals as a function of the distance between the sensor and incremental portions of the scanned surface as the package passes.

The signal processor receives the distance signals from the sensor and generates the profile in the form of a data curve. The data curve is analyzed by signal analysis and compared with the stored profile of a package.

According to a further embodiment, a plurality of sensors is provided to scan additional surfaces of the package, respectively. The profiles resulting from each scanned surface are compared with stored profiles of corresponding surfaces of a package having a normal configuration.

A method for detecting leaks in vacuum packages is also provided. A surface of the package is scanned to generate a contour signal corresponding with the contour of the scanned surface. The contour signal is processed to generate a profile of the scanned surface. The profile is compared with a stored profile corresponding to a normal configuration for the vacuum package surface.

BRIEF DESCRIPTION OF THE FIGURES

Other objects and advantages of the invention will become apparent from a study of the following description when viewed in the light of the accompanying drawing, in which.

DETAILED DESCRIPTION

Figure 1:
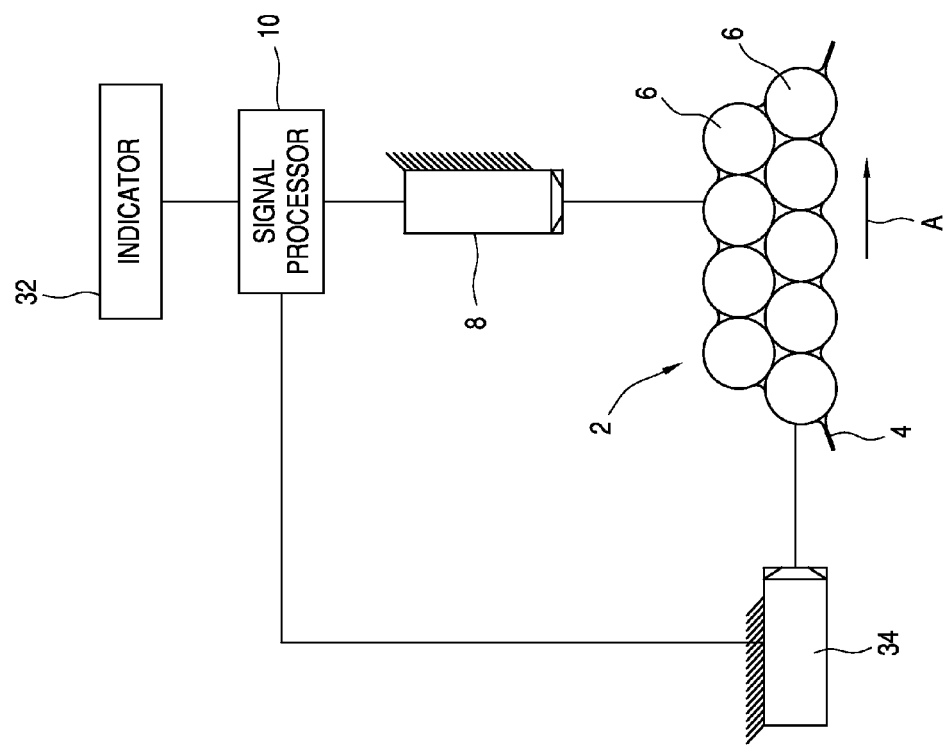
FIG. 1 is a schematic view of a leak detection system for vacuum packages according to the invention.

FIG. 1 shows a system for scanning vacuum packages for products according to the invention. By way of example, the package 2 is a synthetic plastic bag 4 is for a plurality of hot dogs 6. After the products are inserted into the bag, a suction device (not shown) removes excess air from the interior of the bag. This causes the bag to compress against the hot dogs. Once the vacuum packing is complete, the resulting package has a uniform configuration such as shown in FIG. 1. Of course, different products which are subject to vacuum packaging will have different final configurations or contours, just as the configuration of packages for different numbers or sized of products will have different configurations. Nevertheless, for the same size and number of products arranged in a vacuum package, the final package will have a consistent shape in the absence of any defect in the package.

The package 2 is arranged on a conveyor (not shown) for transport in the direction of arrow A beneath a sensor such as a scanning device 8. The scanning device is preferably a distance measuring device. Examples of suitable devices include a distance sensor, a line scan camera, a laser proximity sensor, a laser displacement sensor, and a mechanical wheel or whisker. In a preferred embodiment, the scanning device is fixed, so that the distance between the device and incremental portions of the surface of the package is measured as the package passes on the conveyor beneath the scanner. Alternatively, the scanning device may sweep across the direction of travel of the package in order to measure the contour across a perimeter of the package which shows the most relevant profile.

Figure 2:
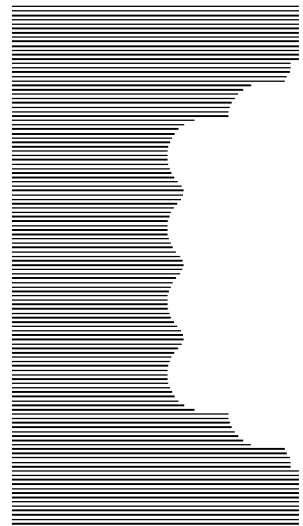
FIG. 2 is a plot of a series of distance readings from the system of FIG. 1 at various locations on a surface of the package.

In the embodiment of FIG. 1, the scanning device 8 measures the contour of the upper surface of the package 2. The scanning device generates a continuous output signal which corresponds to the contour of the surface being scanned. FIG. 2 shows a plot of the sequential distance measurements from the scanning device 8 for the top surface of the package in FIG. 1. Each vertical line represents a distance measurement from the scanning device, which corresponds to the top of the lines, to the top surface of the package.

Figure 3:
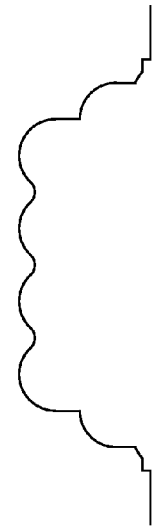
FIG. 3 is a graphical representation of data points for the plot of FIG. 2.
Figure 4:
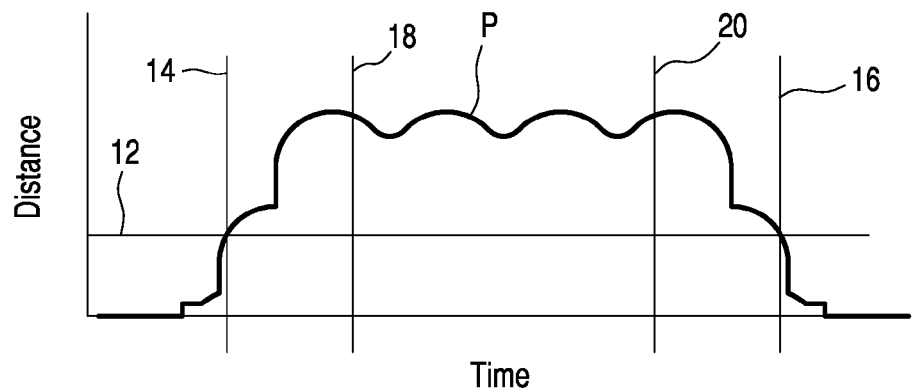
FIGS. 4 and 5 are graphical representations of the plot of FIG. 3 undergoing signal processing and analysis, respectively.

A signal processor 10 such as a computer or a central processing unit is connected with the scanning device 8 to receive and process the output signal from the scanning device as will be developed below. The plot of FIG. 2 can be converted into a series of data points as shown in FIG. 3 which represent the measurements taken by the scanning device 8. The data points can be plotted on a graph for analysis as shown in FIG. 4 with distance being plotted on the vertical axis and time on the horizontal axis. Signal processing includes filtering and differentiation applied to the sampled data curve of FIG. 2. Then, numerical analysis is performed on the data points. Examples of numerical analytical methods which can be performed include determinations of mean, standard deviation, inflection point, amplitude and feature counts of the data curve.

Figure 5:
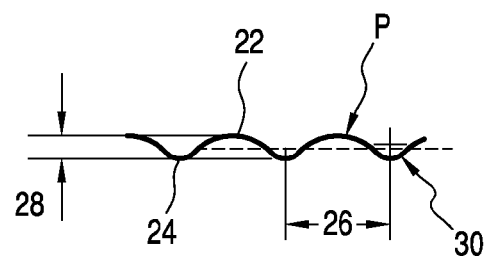

Referring once again to FIG. 4, analysis of the data points will be described. A minimum threshold line 12 is established for the distance measurements. Data logging begins when the plot P crosses the threshold line at 14 and ends when the plot P falls below the threshold line at 16. Typically, data received just before or after the threshold line will be excluded from numerical analysis because it may indicate transitions, sealed film on the perimeter of the package, or other indistinguishable features. Thus, the relevant data for analysis is the portion of the plot P between 18 and 20. This portion is shown in FIG. 5 and includes measurable peaks 22 and valleys 24, distances 26 between valleys, amplitude 28, radius 30, and other properties. For the package 2 with no leaks, the plot P represents the uniform contour of the upper surface which would be expected in all good or undamaged packages for products of the same size and number.

Figure 6:
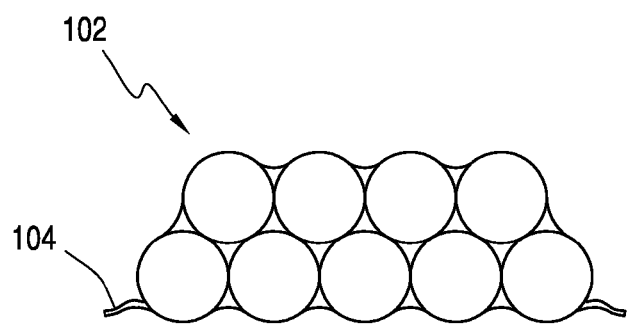
FIG. 6 is schematic view of a vacuum package similar to the package shown in FIG. 1 but deformed as a result of a leak in the package.
Figure 10:
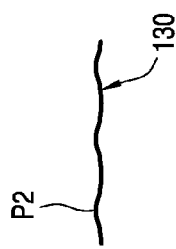
FIGS. 9 and 10 are graphical representations of the plot of FIG. 8 undergoing initial processing and analysis, respectively.
Figure 7:
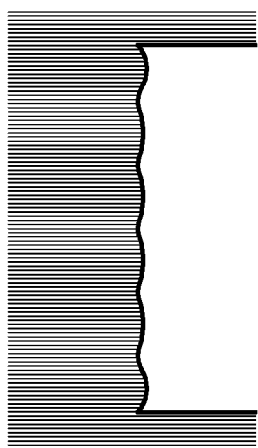
FIG. 7 is a plot of a series of distance readings from scanning a surface of the package of FIG. 6.
Figure 8:
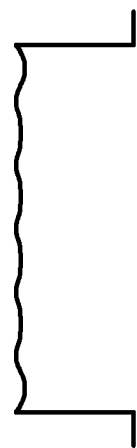
FIG. 8 is a graphical representation of data points for the plot of FIG. 7.
Figure 9:
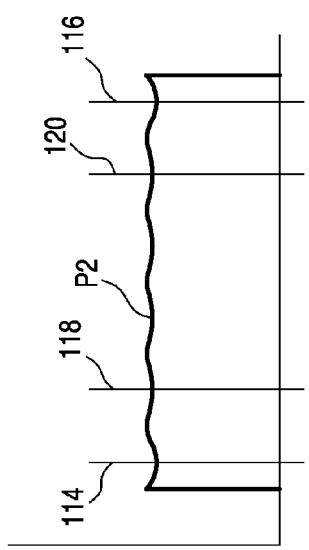

FIG. 6 shows a package 102 similar to that of FIG. 1 except that there is a leak in the bag 104. The leak acts as a vent, allowing air to enter the product. This relaxes the bag so that it is not pressed as tightly against the product as in the good package 2 of FIG. 1. This changes the contour of the upper surface. Accordingly, when a damaged package 102 is scanned by a scanning device, a plot as shown in FIG. 7 is generated which is converted into a series of data points as shown in FIG. 8. The data points are plotted to a graph for analysis as shown in FIG. 9 with threshold lines 114, 116 to define a segment or portion of the plot P2 between 118, 120 to be analyzed as shown in FIG. 10. In the plot P2 of FIG. 10, the radius of curvature 130 is much greater than the comparable radius of curvature 30 for the good package 2. This indicates that the vacuum package 102 has been compromised and the bag 104 has expanded as a result of the loss of vacuum therein.

Referring once again to FIG. 1, the signal processor 10 performs the comparison between the plotted data points generated by scanning successive packages. The data points corresponding to the contour of a selected surface of each scanned package are compared with a baseline for the data points corresponding to the contour of the same surface of a package known to be leak free. The baseline is stored in a memory in the processor. Multiple baselines for multiple packages can be stored in the memory so that the leak detection system according to the invention can be used to scan a variety of vacuum packed products.

An indicator 32 is connected with the signal processor 10 as shown in FIG. 1. The indicator, which may be a display or an audible alarm, provides an indication where the scanned contour of a package deviates from the baseline contour by a given value. This provides an indication that the package is defective as the result of a leak.

Figure 11:
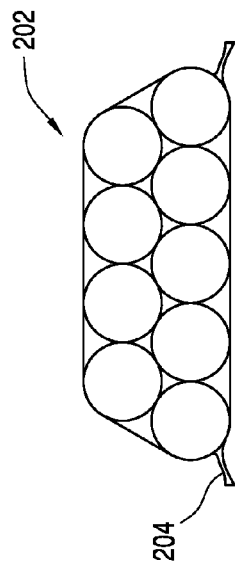
FIGS. 11 and 12 are schematic views of different types of damaged vacuum packages.
Figure 12:
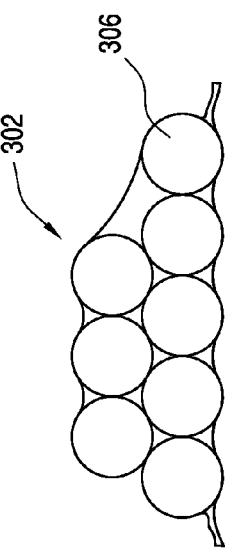

The system according to the invention can also be used to detect other abnormalities in the package. For example, FIG. 11 shows a package 202 in which the bag 204 is not under vacuum as in the case of an open seal. FIG. 12 shows a package 302 which is missing a product 306. The packages of FIGS. 11 and 12 can be scanned by the leak detection system according to the invention and will present different contours when scanned, thus providing an indication of a problem with the package.

While the leak detection system according to the invention will operate sufficiently with a single scanning, other surface contours may be scanned by providing additional scanning devices. Thus, in FIG. 1, an additional scanning device 34 is provided to scan an end surface of the package. The scanning device 34 positioned as shown in FIG. 1 will require that movement of the package in the direction of the arrow A be interrupted for the scanning process. Of course, other scanning devices may be positioned below the object or at various angles depending on the type of scanning device being used.

Figure 13:
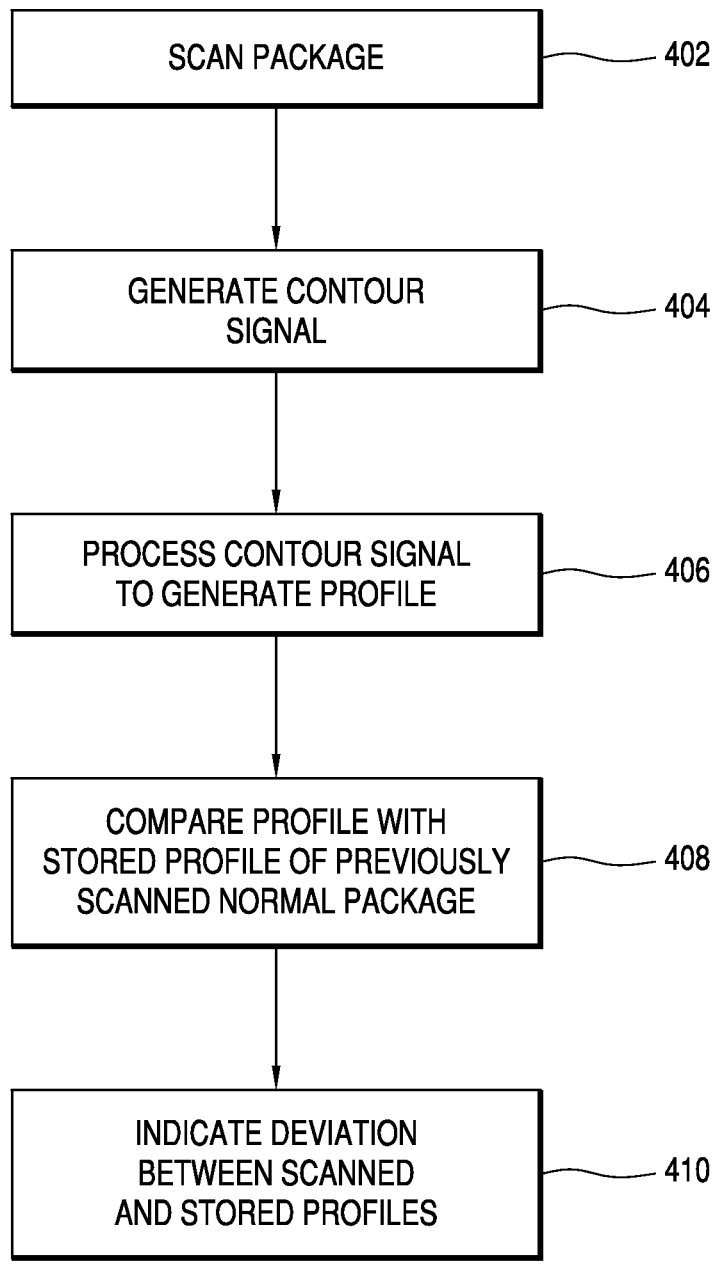
FIG. 13 is a flow diagram illustrating the method steps used for vacuum package leak detection according to the invention.

FIG. 13 is a flow diagram illustrating the basic steps to the leak detection method according to the invention. A surface of the package is initially scanned at step 402 and a contour signal is generated at step 404 corresponding with the contour of the scanned surface. The contour signal is processed at step 406 to generate a profile of the scanned surface. The profile is compared at step 408 with a stored profile of a normal configuration for the package surface. The normal configuration is that of a vacuum package which is known to be free of leaks or other damage. An indication is provided at step 410 when the scanned profile deviates from the stored profile by a given margin, thereby indicating that there is a leak in the scanned package.

The profile preferably comprises a map of data points which may be arranged in a graphical display such as shown in FIGS. 2-5 and 7-10. Signal processing at step 408 includes filtering and differentiation of the contour signal and numerical analysis. As shown in FIGS. 4, 5, 9, and 10, a threshold level of the contour signal is selected in order to perform the numerical analysis.

In accordance with the invention, a leak detector is provided for reliably detecting a leaking bag due to a hole or a bad seal in a uniform vacuum packed bag such as for hot dogs. The leak detector processes a series of packages at a full production rate after they are filled and sealed, and is a simple and cost effective measurement system which incorporates central processor unit based analysis of data. The profile of at least one surface of the vacuum sealed bag is geometrically mapped and an analysis is performed to determine if the contour of the profile indicates that the bag has a leak which would have allowed air to enter the vacuum formed bag due to the pressure differential between the inside of the bag and atmosphere. The scanning device and sample rate provides sufficient data to map the profile accurately and provides a sequence of measurements which can be plotted by the central processor unit and numerically analyzed to extract statistical and geometric properties which can be prepared and conditioned for comparison to stored values of packages known to be leak free. Upon analysis, a determination can be reliably assessed as to whether the bag has allowed egress of air into the package for the purpose of removing this package from the production flow. New vacuum sealed bag profiles and threshold data can easily be trained to the central processing unit of the leak detector system by passing a series of good bags under the scanning device and recording the contour data for the surfaces thereof.

While the preferred forms and embodiments of the invention have been illustrated and described, it will be apparent to those of ordinary skill in the art that various changes and modifications may be made without deviating from the inventive concepts set forth above.

What is claimed is:

1. A leak detection system for vacuum packages containing at least one product, comprising
   (a) a fixed sensor comprising a distance measuring device for scanning a surface of a moving vacuum package by measuring a distance between said sensor and incremental portions of the surface and generating a signal corresponding to the contour of the surface;
   (b) a signal processor connected with said sensor for processing said signal to generate a profile of the vacuum package surface and comparing said profile with a stored profile corresponding to a normal configuration for the vacuum package surface; and
   (c) an indicator device connected with said signal processor for indicating whether the profile of the scanned package surface deviates from the stored profile, thereby providing an indication that has been damage to the vacuum package or product.

2. A leak detection device as defined in claim 1, wherein said distance measuring device comprises one of a distance sensor, line scan camera, linear voltage displacement transducer, laser proximity sensor and laser displacement sensor.

3. A leak detection device as defined in claim 1, wherein said signal processor comprises a programmable device that includes a memory which stores the stored profile.

4. A leak detection device as defined in claim 3, wherein said computer generates a profile in the form of a data curve.

5. A leak detection system as defined in claim 4, wherein said computer analyzes said data curve for comparison with said stored profile.

6. A leak detection system as defined in claim 1, and further comprising a plurality of sensors for scanning a plurality of surfaces of the vacuum package, said signal processor comparing profiles for each scanned surface with stored profiles corresponding to a normal configuration for corresponding surfaces of said vacuum package.

7. A method for detecting leaks in vacuum packages, comprising the steps of
   (a) scanning a surface of the vacuum package with a distance measuring device from said package to measure a distance between said measuring device and incremental portions of the surface;
   (b) generating a contour signal with a signal processor, said contour signal corresponding with the contour of the scanned surface;
   (c) processing said contour signal with the signal processor to generate a profile of the scanned surface;
   (d) comparing said profile with the signal processor with a stored profile corresponding to a normal configuration for said vacuum package surface;
   (e) indicating when said scanned profile deviates from said stored profile, thereby indicating that there is a leak in the vacuum package owing to a change in the configuration of the package.

8. A method as defined in claim 7, wherein said profile comprises a map of data points.

9. A method as defined in claim 8, wherein said processing step comprises filtering and differentiating said contour signal.

10. A method as defined in claim 9, wherein said processing step further comprises numerical analysis.

11. A method as defined in claim 10, wherein a threshold level of said contour signal is selected for numerical analysis.

* * * * *